United States Patent
Hsu et al.

(10) Patent No.: US 7,130,997 B2
(45) Date of Patent: Oct. 31, 2006

(54) METHOD OF REGISTERING A PORTION OF RAM WITH FIRMWARE TO PRESERVE THE PORTION DURING REBOOT

(75) Inventors: Yu-Cheng Hsu, Tucson, AZ (US); John Norbert McCauley, Tucson, AZ (US); Richard Anthony Ripberger, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 416 days.

(21) Appl. No.: 10/447,868

(22) Filed: May 29, 2003

(65) Prior Publication Data

US 2004/0243795 A1    Dec. 2, 2004

(51) Int. Cl.
*G06F 9/00*    (2006.01)

(52) U.S. Cl. ............................... 713/2; 713/1; 713/100

(58) Field of Classification Search ............... 713/1, 713/2, 100
See application file for complete search history.

(56) References Cited

U.S. PATENT DOCUMENTS

| | | | |
|---|---|---|---|
| 3,801,963 A | 4/1974 | Chen ........................ 340/172.5 |
| 4,905,196 A | 2/1990 | Kirrmann .................... 365/200 |
| 5,109,414 A * | 4/1992 | Harvey et al. .............. 725/135 |
| 5,142,323 A * | 8/1992 | Iwamoto ....................... 399/17 |
| 5,351,185 A * | 9/1994 | Takeuchi et al. .............. 700/79 |
| 5,420,996 A | 5/1995 | Aoyagi ........................ 395/425 |
| 5,586,291 A | 12/1996 | Lasker et al. ................ 395/440 |
| 5,761,406 A | 6/1998 | Kobayashi et al. .... 395/182.22 |
| 5,809,542 A | 9/1998 | Tsuboi et al. ................ 711/162 |
| 5,828,823 A | 10/1998 | Byers et al. ............. 395/182.22 |
| 5,887,243 A * | 3/1999 | Harvey et al. .............. 725/136 |
| 5,974,512 A | 10/1999 | Chiba .......................... 711/162 |
| 5,987,495 A | 11/1999 | Ault et al. .................... 709/108 |
| 6,209,088 B1 | 3/2001 | Reneris .......................... 713/1 |
| 6,237,091 B1 | 5/2001 | Firooz et al. ................... 713/1 |
| 6,253,320 B1 * | 6/2001 | Sekiguchi et al. ............. 713/2 |
| 6,389,556 B1 | 5/2002 | Qureshi ........................ 714/15 |
| 6,434,696 B1 | 8/2002 | Kang ............................ 713/2 |
| 6,439,994 B1 * | 8/2002 | Tsukahara .................... 463/20 |

OTHER PUBLICATIONS

"Coordinating Multiple Server Partitions to Enter Power-Save State", IBM Technical Disclosure Bulletin, vol. 39, No. 06, Jun. 1996, pp. 235-239.

* cited by examiner

*Primary Examiner*—Chun Cao
*Assistant Examiner*—Malcolm Cribbs
(74) *Attorney, Agent, or Firm*—John H. Holcombe

(57) ABSTRACT

Processor(s) operating a random access memory is subject to reboot processing which comprises clearing the random access memory. Registration is provided of a portion of the random access memory, the registration indicating that data stored in the registered portion of the random access memory is to be preserved during the reboot processing. In reboot processing, the processor responds to the registration, preventing data stored in the registered portion from clearing during the reboot processing.

27 Claims, 1 Drawing Sheet

METHOD OF REGISTERING A PORTION OF RAM WITH FIRMWARE TO PRESERVE THE PORTION DURING REBOOT

FIELD OF THE INVENTION

This invention relates to random access memories for storing data, for example, in an information handling system, and, more particularly, to random access memories that are subject to clearing of the memory as the result of reboot processing.

BACKGROUND OF THE INVENTION

Saving data in the event of power loss has been addressed in many instances, and typically comprises storing the data in a nonvolatile memory, such as a battery backed up memory or a disk drive, and also addressed by electrical back up systems to allow power to continue to be supplied to the system to allow any data to be saved.

More likely to occur, however, is a reboot of the system, and typically while the system is operating. This is especially a concern for data that is to be written to recordable media. Typically, the data is temporarily stored or buffered in random access memory as it is being written to recordable media. The original source of that data is typically freed to overwrite the data. One example is a data storage system that stores data on recordable media, and indicates to the host that supplied the data, that the data has been received when it is temporarily stored or buffered in random access memory. The host system may follow a similar procedure, and place the data in a buffer to be provided to the data storage system, releasing the program that was the source of that data. Data that has been read from the recordable media, and is being altered before being rewritten, is also typically stored in random access memory during the processing.

A system reboot typically involves clearing the random access memory. As the result, the data stored in the random access memory will be deleted. If the data is being altered, the alterations are lost. Thus, if lost, read data being processed would have to be reaccessed and the processing conducted again. If write data being temporarily stored or buffered is lost, no source data may be available to reconstitute that data. A solution has been to make the reboot process wait, move the data to a nonvolatile store, wait for the reboot to complete, access the data from the nonvolatile store, and again temporarily store or buffer the data. Processing of the data or conducting the process of writing the data may then be resumed. This, however, requires two types of storage for the data, one of which is necessary only during reboot, and requires processes for moving the data back and forth.

SUMMARY OF THE INVENTION

The present invention comprises an information handling system, a computer program product, and a method, involving at least one random access memory for storing data, where the processor(s) operating the random access memory is subject to reboot processing which comprises clearing the random access memory.

In various embodiments, firmware, the computer program product, and the method, provide registration of a portion of the random access memory, the registration indicating that data stored in the registered portion of the at least one random access memory is to be preserved during the reboot processing, the processor responding to the registration, preventing the data stored in the registered portion from clearing during the reboot processing.

In a further embodiment, an interface is provided for accessing the firmware and registering a portion of the at least one random access memory with the firmware. The interface, in one embodiment, comprises an application program interface for accessing the registration firmware, computer readable code, or step.

In other embodiments, the registration is provided as a preservation attribute for the registered portion of the at least one random access memory, is provided in the form of beginning and ending addresses of the portion of the random access memory, and/or is provided in the form of a beginning address and length of the portion of the random access memory.

Where the random access memory is arranged in blocks, in one embodiment, the registration is provided in the form of identified blocks of the random access memory. The registration, in one embodiment, is provided as a preservation attribute for each identified block of the registered portion of the random access memory.

In another embodiment, where the random access memory is employed in a data storage system for reading and/or writing data with respect to recordable media, the registration comprises a portion of the random access memory storing data to be written to the recordable media.

In a further embodiment, an interface is provided for a program for changing the registration of a portion of the random access memory.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
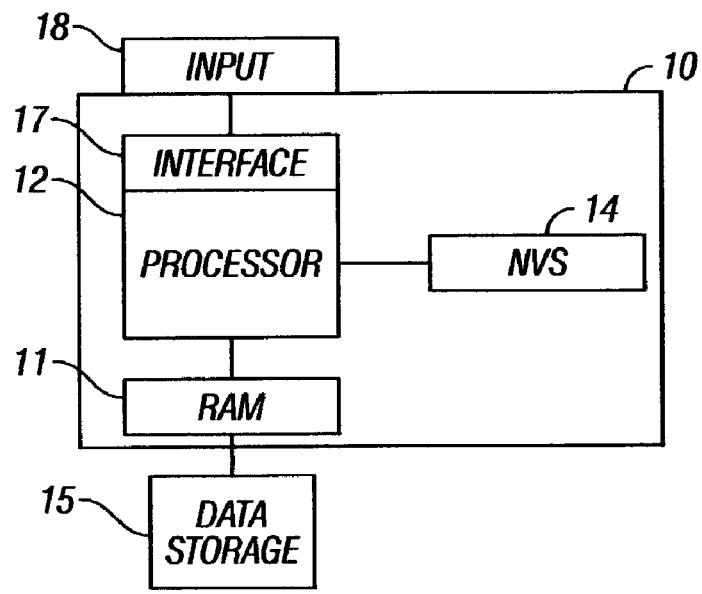
FIG. 1 is a block diagram of an embodiment of an information handling system implementing the present invention.

FIG. 1 illustrates an embodiment of an information handling system 10 having at least one random access memory 11 for storing data, and having at least one programmable computer processor 12 operating the random access memory. The processor 12 is subject to reboot processing which comprises clearing the random access memory 11. In one embodiment, the present invention is a computer program product, which for example, may be stored in a nonvolatile memory 14. The nonvolatile memory may comprise a part of the processor 12, or may be a separate part of the information handling system. When stored in nonvolatile memory 14, the computer program product may comprise firmware. Alternatively, the firmware may be stored in a read only memory.

The at least one programmable computer processor 12 operates under the control of program code. The programmable computer processor may comprise any processor device known in the art, and may be implemented in a data storage server or a host, as is known to those of skill in the art. In the function of a data storage server, the information handling system 10 may encompass, or be associated with, data storage devices 15, as are known to those of skill in the art. An example of a data storage server comprises the IBM Enterprise Storage Server. The method of the present invention may be provided in the form of a computer program product usable with a programmable computer processor having computer readable program code embodied therein, and may be supplied to the programmable computer processor 12 in any of various ways as are known to those of skill in the art.

An interface 17 may be provided which communicates via an input 18, for example, with a user or with an administrator. The input 18 may comprise one or more workstations or terminals and GUI (graphical user interface) interfaces 17. Alternatively, or additionally, the interface 17 may comprise an internal interface with programs which operate the random access memory (or memories) 11. The interface 17 may comprise an application program interface for accessing the registration firmware, computer readable code, or step.

The random access memory (or memories) 11 may comprise any type of RAM used to store data, and may comprise volatile or nonvolatile memory which is subject to being cleared during or as part of a reboot process.

The random access memory (or memories) 11 is arranged in various portions as is known to those of skill in the art. For example, the random access memory(ies) may be arranged in blocks of fixed size, such as 16 megabytes (mb). The physical addressing of the memory(ies) may be by block identifier. Logical addressing of the memory(ies) may be by block, or may be by addresses, such as the beginning and ending addresses, or may be by address and length.

One application of an information handling system 10 may comprise processing data, such as reading data from recordable media, altering that data, and rewriting the altered data. That data may be stored in random access memory 11 during the processing.

Another application of an information handling system 10 comprises writing data to recordable media, such as data storage 15. The data is temporarily stored or buffered in random access memory 11 as it is being written to recordable media. The original source of that data is typically freed to overwrite the data. One example is a data storage system that stores data on recordable media, and indicates to the host that supplied the data, that the data has been received when it is temporarily stored or buffered in random access memory. As another example, a host system may place the data in a buffer to be provided to the data storage system, releasing the program that was the source of that data.

Figure 2:
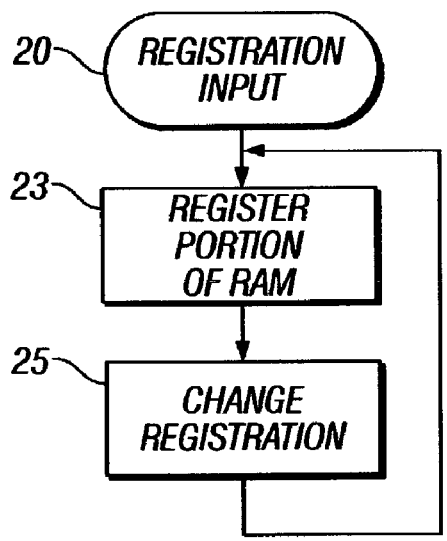
FIG. 2 is a flow chart depicting an embodiment of the present invention for registering a portion of random access memory.

Referring additionally to FIG. 2, in one embodiment of the present invention, a portion of the random access memory may be registered, the registration indicating that data stored in the registered portion of the at least one random access memory is to be preserved during the reboot processing.

The registration may be conducted, beginning at step 20, at interface 17, via an input 18, for example, from a user or an administrator. The input 20 may be conducted at a workstation or terminal, employing, for example, a GUI (graphical user interface) interface 17. Alternatively, or additionally, the registration 20 may be by means of defaults of the present application or may be conducted via internal interface 17 by preset defaults of programs which operate the random access memory (or memories) 11.

In one embodiment, the registration 20 is provided in the form of beginning and ending addresses of the portion of the random access memory. In another embodiment the registration is provided in the form of a beginning address and length of the portion of the random access memory.

Where the random access memory 11 is arranged in logical blocks, in one embodiment, the registration is provided in the form of identified logical blocks of the random access memory.

In step 23, the identified portion of the random access memory is registered. In one embodiment, the registration is provided as a preservation attribute for the registered portion of the random access memory(ies) 11. The registration, originated as a logical or physical address in step 20, is made, in one embodiment, by physical block identifiers. Thus, for example, if the registration is of a sequence of physical blocks, the first and last physical block identifiers may be employed, and identified in a table. Alternatively, the registration 23, in one embodiment, is provided as a preservation attribute for each identified logical or physical block of the registered portion of the random access memory.

In one embodiment, where the random access memory 11 is employed in a data storage system for reading and/or writing data with respect to recordable media, the registration 23 comprises a portion of the random access memory 11 storing data to be written to the recordable media, for example, at data storage 15.

In a further embodiment, an interface, such as interface 17, is provided for a program to, optionally, in step 25, change the registration of a portion of the random access memory. The program may be involved in allocating the random access memory 11, and may override allocation of a part of the registered portion to, for example, data storage. Alternatively, the program may allocate a part of the registered portion to an alternate data storage, and therefore allocate the part of the registered portion in a different registration process. When step 25 is conducted, the registration of that portion of RAM is made in step 23.

By means of the registration, the processor preserves the data stored in the registered portion from clearing during reboot processing.

Figure 3:
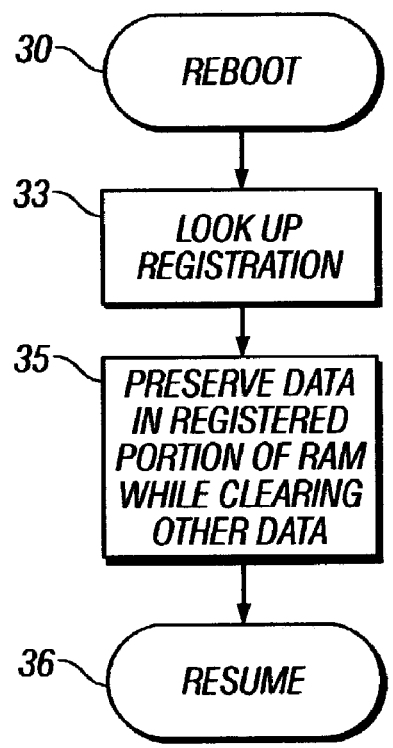
FIG. 3 is a flow chart depicting an embodiment of the present invention for preserving data during a reboot process.

Referring to FIGS. 1 and 3, upon a reboot process 30, the computer program product or firmware operates the computer processor 12 conducting the reboot process to, in step 33, look up the registration.

In step 35, the processor responds to the registration, preserving the data in the registered portion of the random access memory(ies) 11 by preventing the data stored in the registered portion from clearing during the reboot processing. The normal processing may resume in step 36.

The illustrated components of the information handling system of FIG. 1, and the arrangement of the registration may be varied, combined, or combined functions may be separated. The illustrated steps of FIGS. 2 and 3 may be altered in sequence, omitted, or other steps added.

While the preferred embodiments of the present invention have been illustrated in detail, it should be apparent that modifications and adaptations to those embodiments may occur to one skilled in the art without departing from the scope of the present invention as set forth in the following claims.

We claim:

1. An information handling system, comprising:
   at least one random access memory for storing data;
   at least one processor operating said at least one random access memory, said at least one processor subject to reboot processing which comprises clearing said at least one random access memory;
   firmware providing registration of a portion of said at least one random access memory, said registration indicating that data stored in said registered portion of said at least one random access memory is to be preserved during said reboot processing, said at least one processor responding to said registration, preventing said data stored in said registered portion from said clearing during said reboot processing; and
   an interface accessing said firmware and registering a portion of said at least one random access memory with said firmware.

2. The information handling system of claim 1, wherein said interface comprises an application program interface accessing said firmware.

3. The information handling system of claim 1, wherein said firmware provides said registration as a preservation attribute for said registered portion of said at least one random access memory.

4. The information handling system of claim 1, wherein said firmware provides said registration in the form of beginning and ending addresses of said portion of said at least one random access memory.

5. The information handling system of claim 1, wherein said firmware provides said registration in the form of a beginning address and length of said portion of said at least one random access memory.

6. The information handling system of claim 1, wherein said at least one random access memory is arranged in blocks, and wherein said firmware provides said registration in the form of identified said blocks of said at least one random access memory.

7. The information handling system of claim 6, wherein said firmware provides said registration as a preservation attribute for each said identified block of said registered portion of said at least one random access memory.

8. The information handling system of claim 1, wherein said information handling system comprises a data storage system for reading and/or writing data with respect to recordable media, and wherein said firmware registration comprises a portion of said at least one random access memory storing data to be written to said recordable media.

9. The information handling system of claim 1, wherein said interface is an interface for a program for changing said registration of a portion of said at least one random access memory with said firmware.

10. A computer program product usable with at least one programmable computer processor having computer readable code embodied therein, said at least one programmable computer processor for operating at least one random access memory for storing data, said at least one programmable computer processor subject to reboot processing, said reboot processing causing said at least one programmable computer processor to clear said at least one random access memory, said computer program product comprising:
   computer readable program code causing said at least one programmable computer processor to register a portion of said at least one random access memory, said registration indicating that data stored in said registered portion of said at least one random access memory is to be preserved during said reboot processing;
   computer readable program code causing said at least one programmable computer processor to respond to said registration, preventing said data stored in said registered portion from said clearing during said reboot processing; and
   computer readable program code causing said at least one programmable computer processor to provide an interface accessing said registration computer readable program code for causing said at least one programmable computer processor to register a portion of said at least one random access memory.

11. The computer program product of claim 10, wherein said computer readable program code causing said at least one programmable computer processor to provide an interface comprises an application program interface.

12. The computer program product of claim 10, wherein said computer readable program code causing said at least one programmable computer processor to register a portion of said at least one random access memory, provides said registration a a preservation attribute for said registered portion of said at least one random access memory.

13. The computer program product of claim 10, wherein said computer readable program code causing said at least one programmable computer processor to register a portion of said at least one random access memory, provides said registration in the form of beginning and ending addresses of said portion of said at least one random access memory.

14. The computer program product of claim 10, wherein said computer readable program code causing said at least one programmable computer processor to register a portion of said at least one random access memory, provides said registration in the form of a beginning address and length of said portion of said at least one random access memory.

15. The computer program product of claim 10, wherein said at least one random access memory is arranged in blocks, and wherein said computer readable program code causing said at least one programmable computer processor to register a portion of said at least one random access memory, provides said registration in the form of identified said blocks of said at least one random access memory.

16. The computer program product of claim 15, wherein said computer readable program code causing said at least one programmable computer processor to register a portion of said at least one random access memory, provides said registration as a preservation attribute for each said identified block of said registered portion of said at least one random access memory.

17. The computer program product of claim 10, wherein said at least one programmable computer processor is employed in a data storage system for reading and/or writing data with respect to recordable media, and wherein said computer readable program code causing said at least one programmable computer processor to register a portion of said at least one random access memory, provides said registration of a portion of said at least one random access memory storing data to be written to said recordable media.

18. The computer program product of claim 10, wherein said computer readable program code causing said at least one programmable computer processor to provide said interface comprises an interface for a program for changing said registration of a portion of said at least one random access memory.

19. A method for operating at least one random access memory for storing data, said at least one random access memory subject to being cleared upon reboot processing of at least one processor associated with said at least one random access memory, comprising the steps of:

registering a portion of said at least one random access memory, said registration indicating that data stored in said registered portion of said at least one random access memory is to be preserved during said reboot processing;

responding to said registration, preventing said data stored in said registered portion from said clearing during said reboot processing; and providing an interface for conducting said registering step to register a portion of said at least one random access memory.

20. The method of claim 19, wherein said step of providing an interface comprises providing an application program interface.

21. The method of claim 19, wherein said step of registering a portion of said at least one random access memory, provides said registration as a preservation attribute for said registered portion of said at least one random access memory.

22. The method of claim 19, wherein said step of registering a portion of said at least one random access memory, provides said registration in the form of beginning and ending addresses of said portion of said at least one random access memory.

23. The method of claim 19, wherein said step of registering a portion of said at least one random access memory, provides said registration in the form of a beginning address and length of said portion of said at least one random access memory.

24. The method of claim 19, wherein said at least one random access memory is arranged in blocks, and wherein said step of registering a portion of said at least one random access memory, provides said registration in the form of identified said blocks of said at least one random access memory.

25. The method of claim 24, wherein said step of registering a portion of said at least one random access memory, provides said registration as a preservation attribute for each said identified block of said registered portion of said at least one random access memory.

26. The method of claim 19, wherein said at least one random access memory is employed in a data storage system for reading and/or writing data with respect to recordable media, and wherein said step of registering a portion of said at least one random access memory, provides said registration of a portion of said at least one random access memory storing data to be written to said recordable media.

27. The method of claim 19, wherein the step of providing said interface comprises providing an interface for a program for changing said registration of a portion of said at least one random access memory.

* * * * *